United States Patent [19]

Yoshino

[11] Patent Number: 5,043,897
[45] Date of Patent: Aug. 27, 1991

[54] ANTILOCK CONTROL DEVICE

[75] Inventor: Masato Yoshino, Itami, Japan

[73] Assignee: Sumitomo Electric Industries, Ltd., Osaka, Japan

[21] Appl. No.: 465,760

[22] Filed: Jan. 16, 1990

[30] Foreign Application Priority Data

Jan. 14, 1989 [JP] Japan .................................. 1-6561

[51] Int. Cl.⁵ .............................................. B60T 8/32
[52] U.S. Cl. ................................ 364/426.02; 303/95; 303/103
[58] Field of Search ...................... 364/426.01, 426.02; 303/95, 96, 97, 99, 100, 103, 106, 107

[56] References Cited

U.S. PATENT DOCUMENTS

| | | | |
|---|---|---|---|
| 4,485,445 | 11/1984 | Braschel | 364/426.02 |
| 4,666,218 | 5/1987 | Masaki et al. | 364/426.02 |
| 4,824,184 | 4/1989 | Spadafora et al. | 364/426.02 |
| 4,836,619 | 6/1989 | Muto | 364/426.02 |
| 4,864,504 | 9/1989 | Koshizawa et al. | 364/426.02 |
| 4,883,325 | 11/1989 | Shimanuki et al. | 364/426.02 |

Primary Examiner—Parshotam S. Lall
Assistant Examiner—Tyrone Queen
Attorney, Agent, or Firm—Wenderoth, Lind & Ponack

[57] ABSTRACT

An antilock control device includes a brake operation detecting unit, a wheel speed detecting unit, a control unit which detects a request for antilock control on the basis of a brake operation signal from the brake operation detecting unit and wheel speed signals from the wheel speed detecting unit and outputs a brake pressure control signal, and a brake pressure control circuit operative in response to said brake pressure control signal. The control unit has a judging function for detecting a request for starting antilock control while the vehicle speed is between a relatively low first predetermined speed and a higher second predetermined speed and the brake operation signal is OFF and a function of deciding whether to permit or prohibit the execution of antilock control. More specifically, if no request for starting antilock is detected, permission to execute antilock control is given while the vehicle speed is higher than the first predetermined value. If a request for starting antilock control is detected, the execution of antilock control is prohibited while the vehicle speed is between the first and second predetermined values. In another arrangement, even if such a request is detected, permission to execute antilock control is given while the vehicle speed is between the first and second predetermined speeds, provided the brake operation signal is ON.

9 Claims, 8 Drawing Sheets

ANTILOCK CONTROL DEVICE

BACKGROUND OF THE INVENTION

The present invention relates to an antilock control device which can prevent the braking pressure from decreasing if a wheel speed detecting unit should malfunction.

A wheel speed detecting unit comprises, for example magnetic pickups or wheel speed sensors provided for the respective wheels of a motor vehicle to pick up the wheel speeds as AC signals, an interface circuit for converting the AC signals into pulse trains, and a timer/counter circuit and a processing circuit for converting the pulse trains into digital values or an F/V converter for converting the pulse trains into voltages representative of the wheel speeds.

There are various known methods for detecting the malfunction of such wheel speed detecting units. In one of such methods, a wheel speed detecting unit is judged to be malfunctioning if no output signals are detected by the time that the vehicle speed reaches a predetermined point. In another method, a detecting unit is judged to be malfunctioning if the difference among the signals from the wheel speed sensors is larger than a predetermined value after the vehicle speed has reached a predetermined point.

But if the pulse train representative of each wheel speed is normal at a given portion while at another portion, pulses are partially or completely lost, such a prior art malfunction detecting methods might not be able to detect any malfunction at all or might not be able to detect such a malfunction if the timing is bad.

The present inventors proposed an antilock control device (Japanese Patent Application 62-205830) provided with a warning means which is actuated if it is difficult to determine, only from the information supplied from the wheel speed detecting unit, whether there is something wrong with the detecting unit or the wheels are alternately falling into a locked state and recovering from locked state as a result of antilock control and if such a situation continues for a long time. But this device has a problem in that a long time is required for the judgement of a malfunction.

It is generally required that the vehicle speed at which the antilock control becomes inoperative be as low as possible, whereas another requirement is that a malfunction detection of the wheel speed detecting units be carried out only while the vehicle speed is within a relatively high range in order to prevent wrong judgements.

If the antilock control starts while the vehicle speed is within a low range, a request for antilock control will be given before the judgement on a malfunction of the wheel speed detecting unit is given. Thus, there is a possibility that the control may be actually started based on such a request in spite of the fact that it is a wrong request, or a permission to start the antilock control cannot be given until the vehicle speed gets rather high.

SUMMARY OF THE INVENTION

It is an object of the present invention to provide an antilock device which obviates the aforesaid shortcomings.

It is another object of the present invention to provide an antilock control device in which the antilock control is carried out even if the vehicle speed is relatively low in a normal condition and if the wheel speed detecting means is judged to be malfunctioning, the antilock control is prohibited partially while the vehicle speed is relatively low and is permitted while the vehicle speed is relatively high.

According to the present invention, in order to solve the aforesaid problems, a relatively low first speed and a higher second speed are predetermined. In a normal condition, the antilock control is carried out while the vehicle speed is higher than the first predetermined speed. If a request for starting antilock control is given while the vehicle speed is between the first and second predetermined speeds in spite of the fact that a brake operation detecting means detects no operation of the brakes, the antilock control is prohibited totally or partially while the vehicle speed is between the first and second predetermined speeds and permitted almost totally while the vehicle speed is higher than the second predetermined speed.

If a request for antilock control is given while the vehicle speed is between the relatively low first predetermined speed and the higher second predetermined speed, i.e. it is within a comparatively low range, in spite of the fact that the brake operation detecting unit indicates that the brakes are not operated, this suggests that something is wrong with the wheel speed detecting unit. Thus, for safety's sake, the antilock control in a relatively low range should be prohibited totally or partially for the wheel whose speed detecting unit is suspected of malfunctioning.

But the antilock control is carried out virtually completely while the vehicle speed is higher than the second predetermined speed. Thus, there will be no shortage of braking force.

Furthermore, since a malfunction of the wheel speed detecting means can be detected instantly, any dangerous state resulting from a delay in the judgement of a malfunction can be avoided.

BRIEF DESCRIPTION OF THE DRAWINGS

Other features and objects of the present invention will become apparent from the following description taken with reference to the accompanying drawings, in which.

DESCRIPTION OF THE PREFERRED EMBODIMENT

Figure 1:
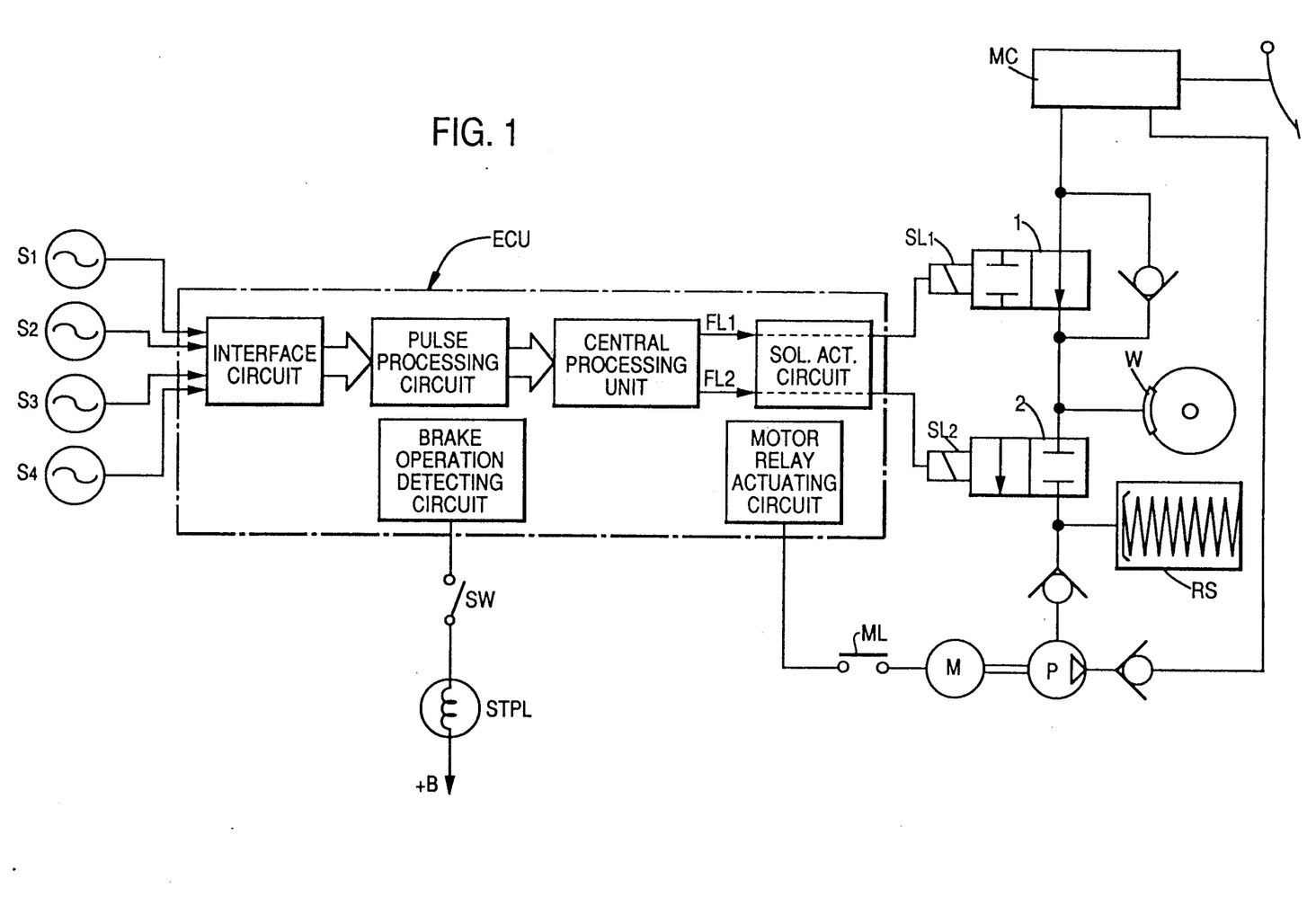
FIG. 1 is a schematic block diagram of the antilock control device according to the present invention.

As shown in FIG. 1, the antilock control device according to the present invention comprises wheel speed sensors $S_1$-$S_4$, an electronic control unit ECU and a fluid pressure control circuit. The electronic control unit comprises an interface circuit, a braking operation detecting circuit, a pulse processing circuit, a central processing unit, a solenoid actuating circuit and a motor relay actuating circuit.

The output signals of the wheel speed sensors $S_1$-$S_4$ (AC voltage signals) are converted into pulses in the interface circuit. The pulse processing circuit counts and calculates the pulses. The values thus obtained are calculated, analyzed and judged in the central processing unit according to a program stored therein. Based on the results thus obtained, operation commands are given to the solenoid actuating circuit and the motor relay actuating circuit to actuate solenoids $SL_1$ and $SL_2$ and a motor relay ML, respectively.

Next, the fluid pressure control circuit and its operation will be described.

A first control valve 1 actuated by the solenoid $SL_1$ is provided in a line between the master cylinder MC and a wheel cylinder W, whereas a second control valve 2 actuated by the solenoid $SL_2$ is provided in a return line extending from the wheel cylinder W to the master cylinder MC. In the state shown in FIG. 1, both the solenoids $SL_1$ and $SL_2$ are deenergized and thus the signals given through signal lines $FL_1$ and $FL_2$ are both OFF signals.

Since the first control valve 1 is open and the second control valve 2 is closed in this state, the master cylinder MC communicates with the wheel cylinder W while the hydraulic circuit back to the master cylinder is closed. Thus, the braking pressure generated in the master cylinder MC is applied directly to the wheel cylinder W to put the wheels in a pressure-increase state.

To switch the pressure control mode from "pressure increase" to "pressure hold", an ON signal is given through the signal line $FL_1$. This will energize the solenoid $SL_1$, thus closing the first control valve 1. Since the second control valve 2 is kept closed in this state, hydraulic fluid will be sealed in the wheel cylinder W, so that the braking pressure is kept constant.

To reduce the braking pressure, ON signals are given through the signal lines $FL_1$ and $FL_2$. This will cause the motor relay actuating circuit to close the motor relay ML and thus to start a motor M. As a result, the solenoids $SL_1$ and $SL_2$ will be energized, thus closing the first control valve 1 and opening the second control valve 2. This will open communication between the wheel cylinder W and a reservoir RS, so that the hydraulic fluid will be pumped out from the reservoir RS by a pump P and flow back into the master cylinder MC. The braking pressure will decrease.

The first and second control valves 1 and 2, the pump P and the motor therefor as shown in FIG. 1 are provided for each wheel.

Figure 2:
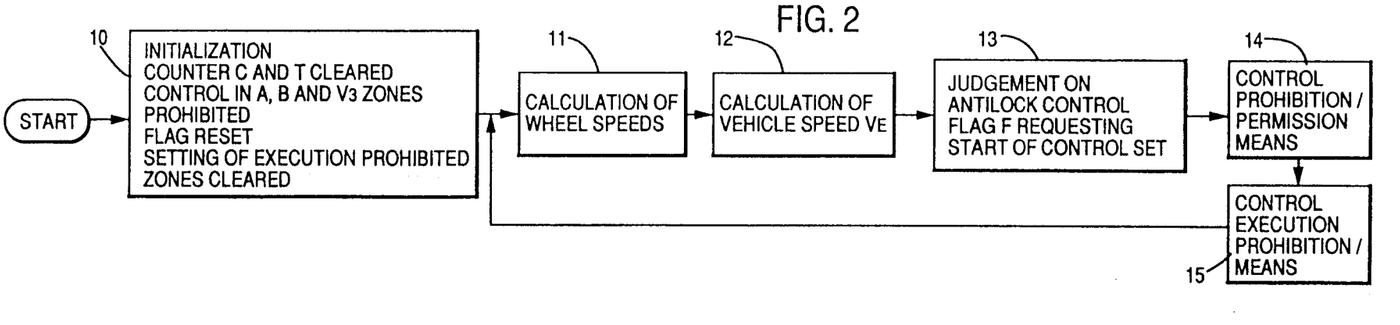
FIGS. 2 to 10 are flow charts illustrating the logic of the programs stored in the antilock control device.

The central processing unit contains a program for making judgements on whether to reduce, hold or increase the braking pressure. FIG. 2 shows this program schematically, in which a subroutine 10 is a step for initialization. The "A zone" indicates a range of vehicle speed between a comparatively low first predetermined speed $V_1$ (e.g. 3-6 km/h) and a second predetermined speed which is higher than the first predetermined speed (e.g. 10-15 km/h). The "B zone" indicates the range of vehicle speed higher than the second pedetermined speed. The "$V_3$ zone" indicates a range of vehicle speed which is variable and which is lower than a speed value which satisfies certain conditions. "Setting of execution prohibited zone" means setting a range of vehicle speed within which no control signals are allowed to be actually given to the hydraulic circuit if a control prohibiting flag is set which indicates that no execution of control is allowed in the A, B or $V_3$ zone. This may simply be a flag. The counters C and T will be described later.

After initialization, permission for interruption is given to execute routine 11 for calculating the wheel speeds. In this routine, the output signals of the pulse processing circuit (FIG. 1) is read out to calculate the wheel speeds. In routine 12, the vehicle speed $V_E$ is calculated, e.g. by filtering the highest wheel speed.

In a routine 13, it is judged whether the wheels are showing a tendency to lock or recovering from a locked state by comparing e.g. the decelerations of the wheels with a reference value or by comparing the slip speeds (vehicle speed minus wheel speeds) with a reference value or by use of any other suitable index. Based on the result of such a judgement, one control mode is selected from among three control modes, i.e. a mode in which the pressure reduction command is continuously given or the pressure reduction and pressure hold commands are given alternately, a mode in which the pressure increase command is output continuously or the pressure increase and the pressure hold commands are alternately given, and a no control mode and it is set as a control mode request.

If a request to start the antilock control is made, a flag F is set.

In routines 14 and 15 if a request for antilock control is issued in the routine 13, it is judged on a certain condition whether to prohibit or permit such a request. Based on the results, the control of braking pressure is carried out.

Figure 3:
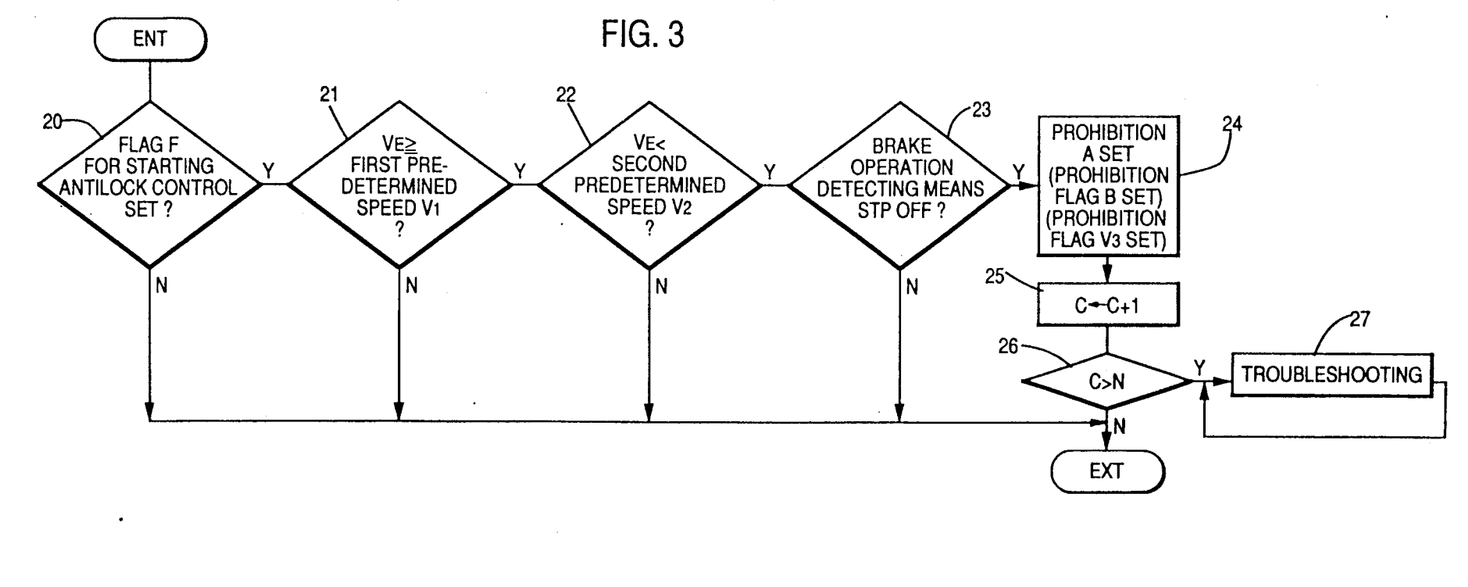

The routine 14 comprises Steps 20 to 27 as shown in FIG. 3. In Step 20, it is judged whether or not the flag F has been set, i.e. whether or not a request for starting antilock control has been issued in the routine 13 (FIG. 2). If judged YES, it is judged in Steps 21 to 23 whether the vehicle speed $V_E$ is between the first predetermined speed $V_1$ and the second predetermined speed $V_2$ and whether an OFF signal is being output from a brake operation detecting unit STP. If the judgements in Steps 21 to 23 turned out to be all YES, a flag for prohibiting execution of control in the A zone (hereinafter referred to as prohibition flag A) is set. No such flags are set for the B zone and the $V_3$ zone at this stage. The case where it is necessary to set the prohibition flags for these zones will be described later.

In Steps 25 and 26, it is judged by a counter C how frequently the prohibition flag A is set during driving. If it is judged that the flag is set too frequently, the ECU determines that the wheel speed detecting means is totally unreliable and necessary measures such as turning on a warning lamp and disabling the antilock function are taken.

Figure 4:
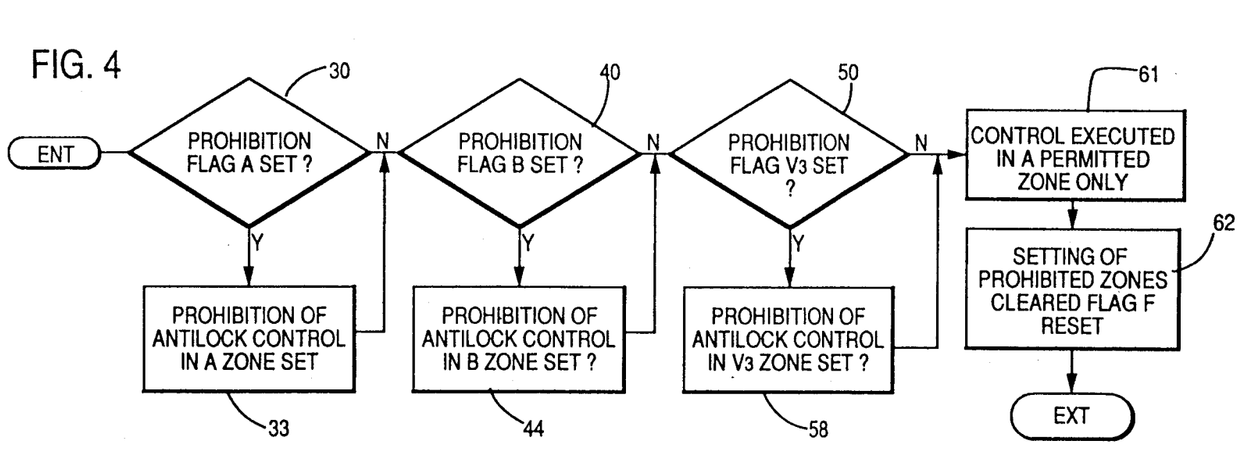

FIG. 4 shows a processing flow of a unit 15 (FIG. 2) for deciding whether to prohibit or permit the execution of antilock control.

The program leaves the routine shown in FIG. 3 through the exit and enters Step 30 shown in FIG. 4. If the prohibition flag A is set, an antilock control prohibiting mode is set in Step 33. The judgements in Steps 40 and 50 will be both No because both prohibition flags B and $V_3$ are not set. In Step 61, the antilock control is carried out only in the zone permitted. The zone permitted means the range of vehicle speeds larger than the first predetermined speed $V_1$, that is, the range including both the A and B zones, if the prohibition flag A is not set. If it is set, the zone permitted will be only the B zone.

Step 62 is for an ordinary resetting procedure.

Figure 5:
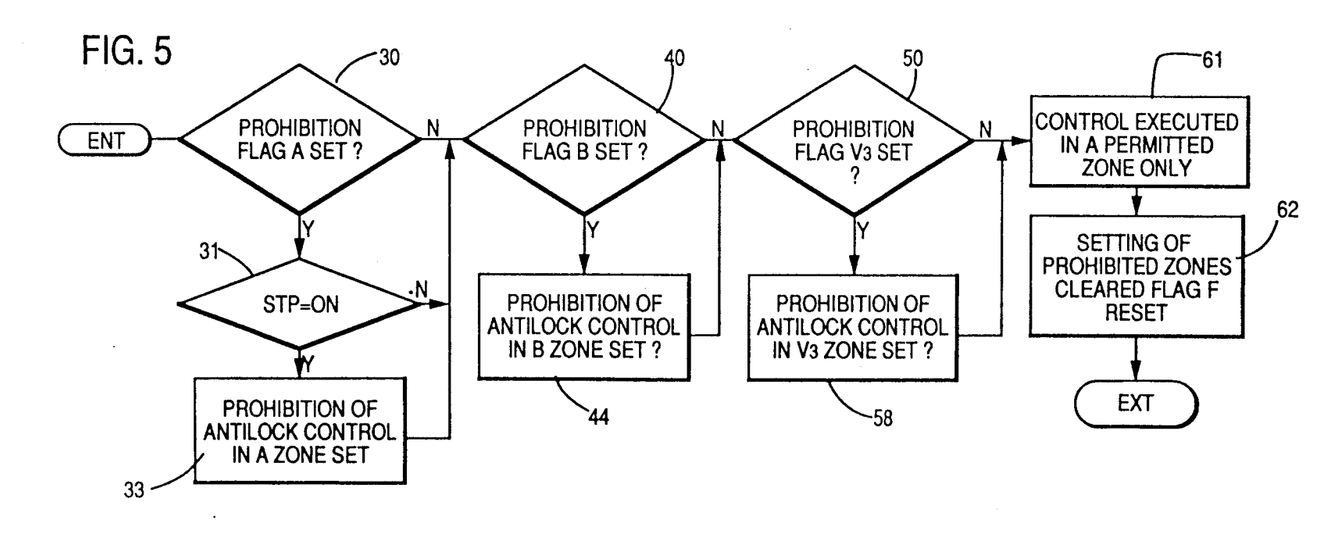

FIG. 5 shows another embodiment of the unit 15 for deciding whether to permit or prohibit the execution of control. In this embodiment, if the prohibition flag A is set, it is judged in Step 31 whether the brake operation detecting unit STP is switched ON or OFF. If it is OFF, the control prohibiting mode is set for the A zone in the same manner as with the foregoing embodiment. In this embodiment, by the provision of Step 31, the execution of antilock control in the A zone is permitted as far as the brakes are being operated even if the prohibiting flag A has been set. The other Steps 40, 50, 61 and 62 are the same as their counterparts in FIG. 4.

Figure 6:
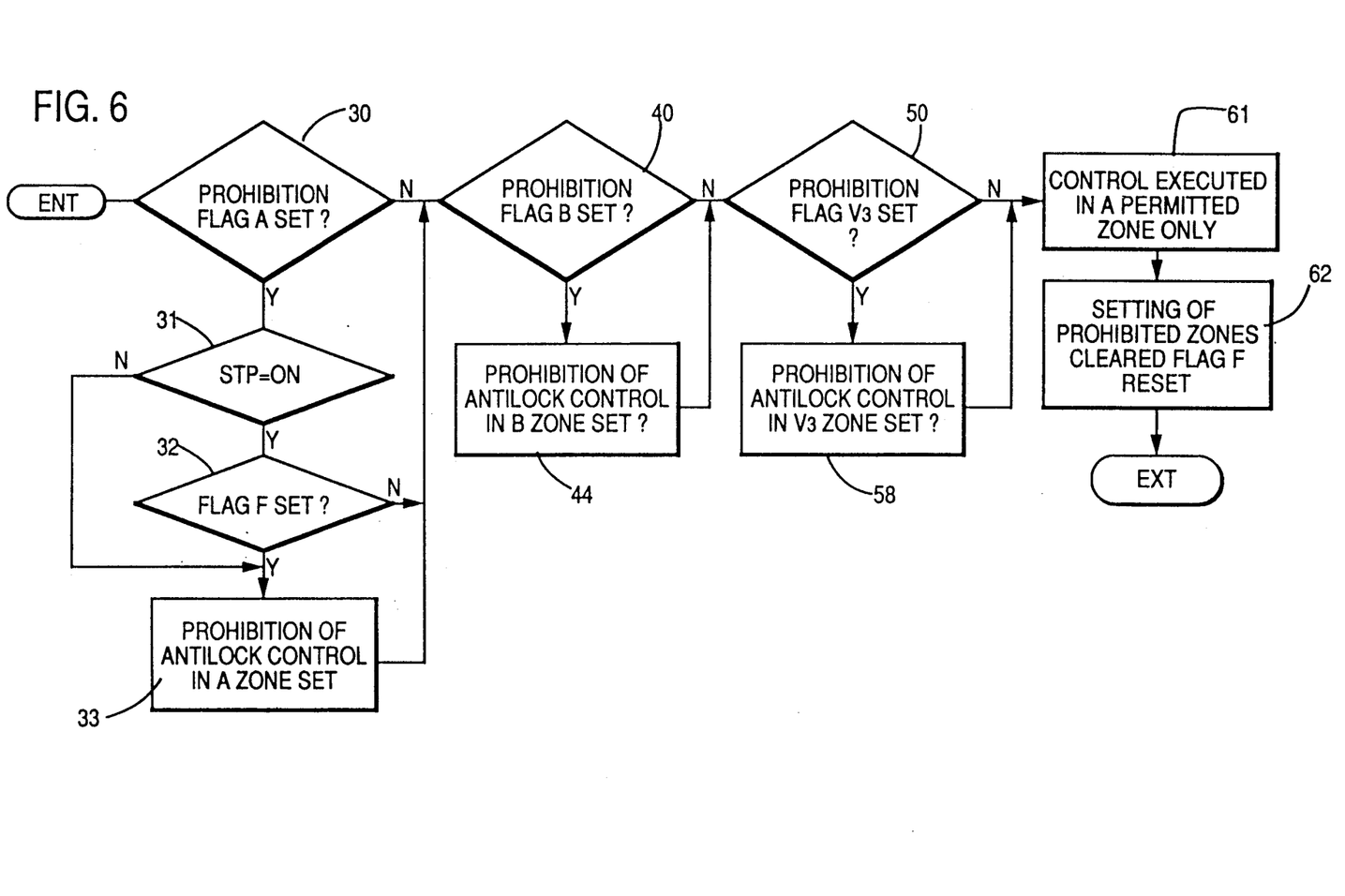

FIG. 6 shows still another embodiment of the unit 15 which additionally includes Step 32 for judging whether or not the flag F has been set in the routine 13 (FIG. 2), namely, a request for the execution of antilock control has been issued.

A new request for the execution of antilock control includes a request for antilock control issued if the one issued immediately before is not executed.

Therefore, even if the brakes are applied with the prohibition flag A set, the execution of antilock control will be prohibited as far as the flag F is set. If the flag F is not set, permission to execute the antilock control will be given. In other words, though no permission to re-start antilock control is granted, it is allowed to continue the control currently in action.

Figure 7:
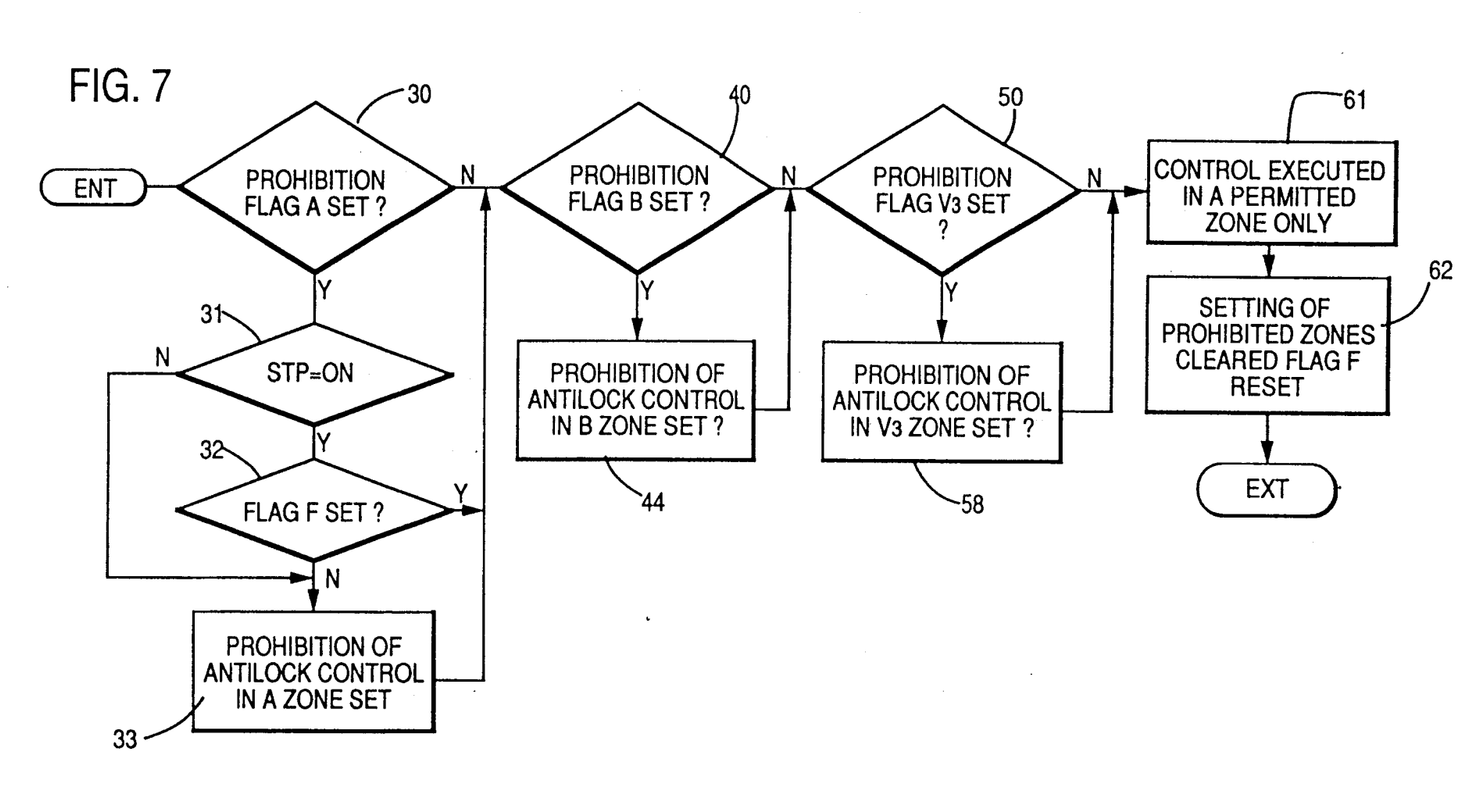

In the embodiment shown in FIG. 7, even if the brake is applied while the prohibition flag A is being set, it is allowed only to re-start antilock control.

Figure 8:
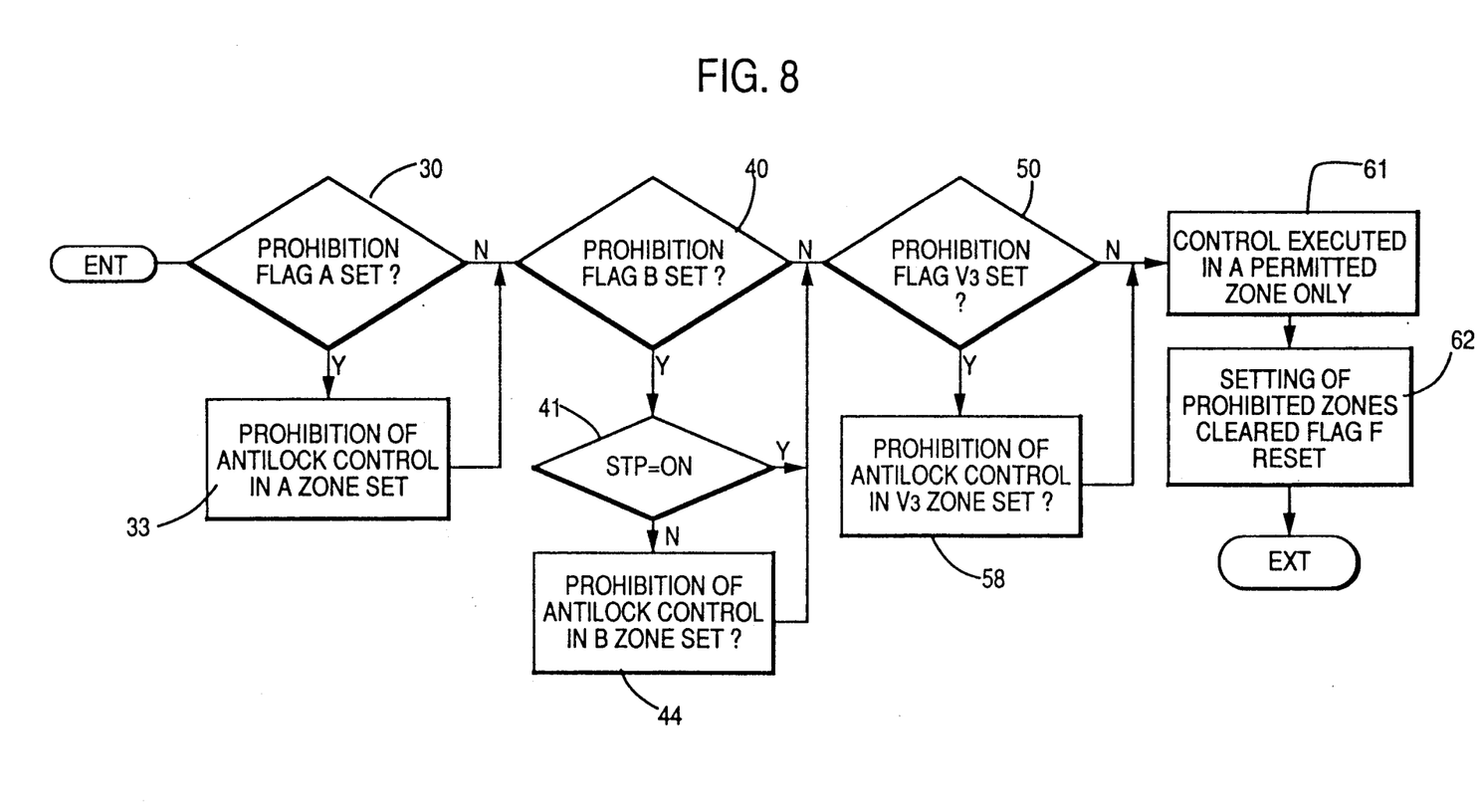
Figure 9:
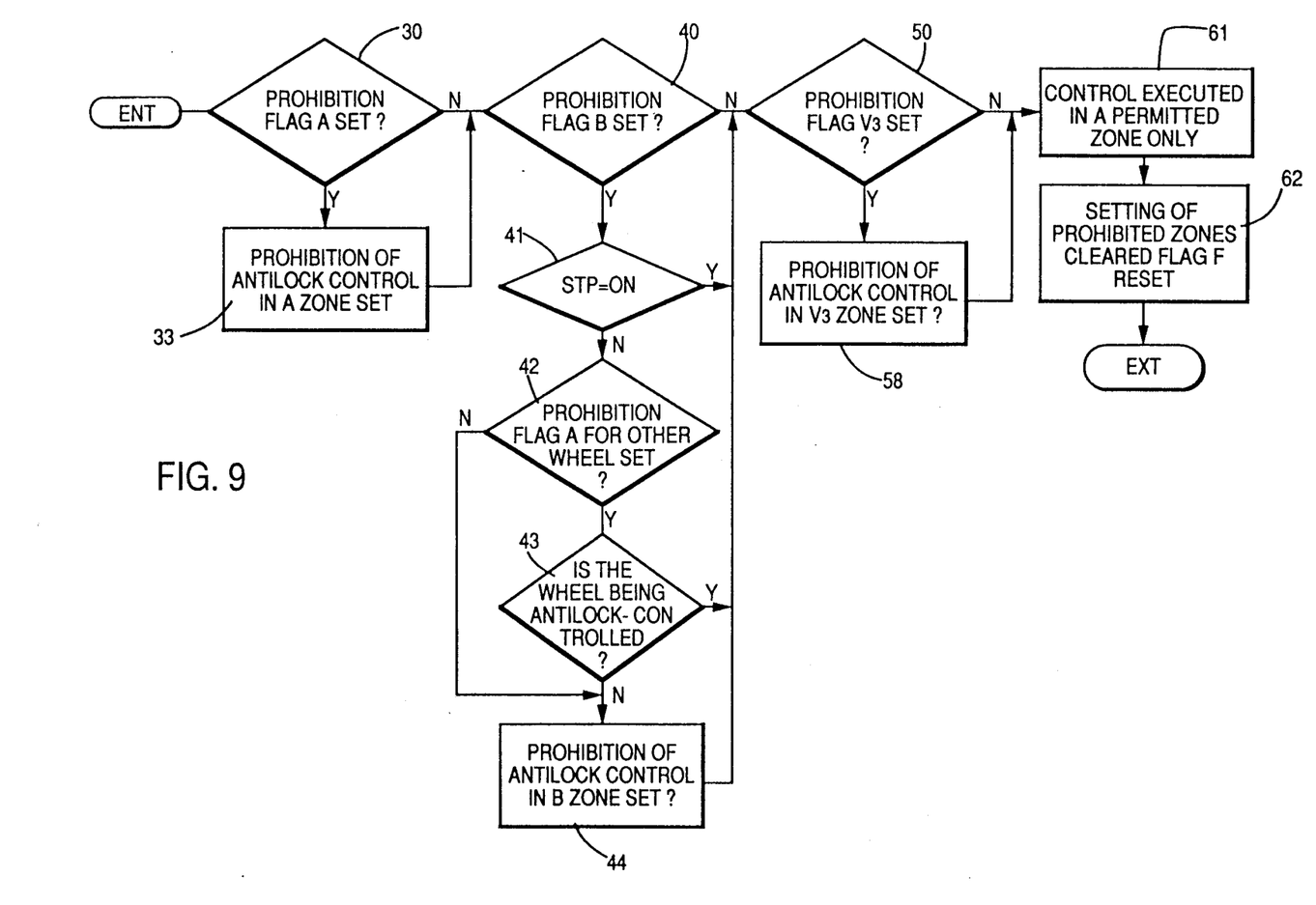

FIGS. 8 and 9 show processing flows which are executed if both the prohibition flags A and B are set in step 24 of FIG. 3, in other words, if the prohibition of control in the A zone affects the control in the B zone. In this case, the antilock control in the A zone may be prohibited in any of the manners shown in FIGS. 4 to 7.

In the routine shown in FIG. 8, it is judged in Step 40 whether or not the prohibition flag B is set. If Yes, it is judged in Step 41 whether the brake operation detecting signal is ON or OFF. If it is OFF, the antilock control in the B zone is prohibited in Step 44. Namely, if the prohibition flag B is set, when the prohibition flag A has been set, too, the antilock control in the B zone is also prohibited depending upon the position of the braking operation detecting unit.

In the routine shown in FIG. 9, after making a judgement as to whether or not the brakes are being applied in Step 41, it is determined in Step 42 whether or not the prohibition flag A is set for the wheels other than the wheel being controlled. If the prohibition flag A is set for any of the other wheels, the control prohibiting mode in the B zone is set in Step 44. If no prohibition flag A is set for the other wheels, it is judged in Step 43 whether the wheel to be controlled is currently in the antilock control mode. If YES, no control prohibiting mode is set. If NO, the program proceeds to Step 44.

In this example, if the prohibition flag B is set (when the prohibition flag A is always set, too), the antilock control in the B zone is prohibited for the controlled wheel, if the brake is not applied in the B zone. But if no prohibition flag B is set for the other wheels and the controlled wheel is in the antilock control mode, the prohibition of control in the B zone is lifted.

Figure 10:
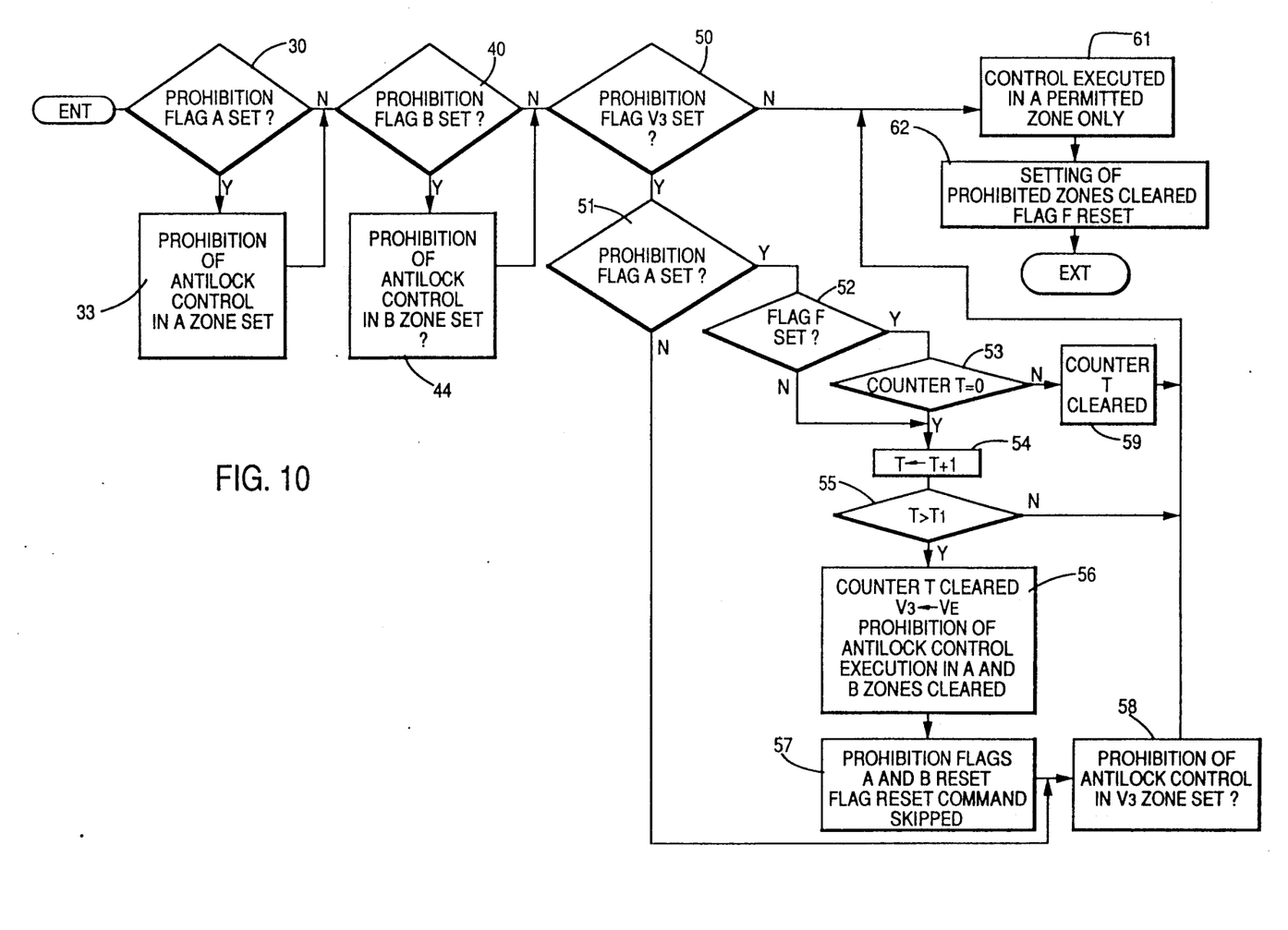

FIG. 10 shows a processing flow when the prohibition flags A, B and $V_3$ are all set. The process while the prohibition flags A and B are being set may be any of those shown in FIGS. 4 to 9.

If the prohibition flag $V_3$ is set, it is judged whether or not the prohibition flag A is set in Step 51. If YES, in Steps 52-55, a timer counter T is checked to judge whether or not the count of the timer has exceeded a predetermined time $T_1$ before a further new request is issued after one request for starting the antilock control. The time $T_1$ should be determined according to the vehicle speed $V_E$ so as to be at least longer than the time necessary for the wheel to make one rotation.

If the timer counter T exceeds the time $T_1$, the antilock control prohibition in the A and B zone (set in Steps 33 and 44) is cleared and the current vehicle speed $V_E$ is set to $V_3$ in Step 56. In Step 57, the prohibition flags A and B are reset and a command to skip Step 34, where the prohibition flags A and B are set, is given. In Step 58, the control prohibition mode is set for the zone lower than $V_3$.

If it is found in Step 53 that the indication of the timer counter T is not zero, which means that a fresh request for antilock control has been made during the time $T_1$, the counter T is cleared in Step 59 before entering Step 61.

The changeover to the control in the $V_3$ zone should be executed only while the vehicle is being accelerated.

The above-described control scheme may be applied to each of the wheels to control them independently of one another.

Otherwise, the rear wheels may be controlled so that the results of control for the wheel rotating at a lower speed will be applied to the other wheel (select-low mode) so as to prohibit the antilock control on all the wheel if both rear wheels get into a certain control prohibited state.

Further such a prohibited state may be adapted to be cleared when the vehicle stops.

As an example of the brake operation detecting means, there is shown in FIG. 1 a switch SW in a stop lamp STPL. But it may be a fluid pressure switch provided in the braking pressure control circuit or a combination thereof.

What is claimed is:

1. An antilock control device comprising a brake operation detecting means, a wheel speed detecting means, a control means for detecting a request for antilock control on the basis of a brake operation signal from said brake operation detecting means and wheel speed signals from said wheel speed detecting means and for providing a brake pressure control signal, and a brake pressure control circuit operative in response to said brake pressure control signal, a judging means for judging whether or not a request for starting antilock control has been detected by said control means while the vehicle speed is within a range between a relatively low first predetermined value and a relatively high second predetermined value and said brake operation signal is OFF, and a permission/prohibition means for enabling said control means to issue said brake pressure control signal to said brake pressure control circuit while the vehicle speed is higher than said first predetermined value if said judging means judges that said control means has detected no request for starting antilock control, and for prohibiting said control means from issuing said brake pressure control signal to said brake pressure control circuit while the vehicle speed is between said first and second predetermined speeds if said judging means judges that a request for starting antilock control has been detected by said control means.

2. An antilock control device comprising a brake operation detecting means, a wheel speed detecting means, a control means for detecting a request for antilock control on the basis of a brake operation signal from said brake operation detecting means and wheel speed signals from said wheel speed detecting means and for providing a brake pressure control signal, and a brake pressure control circuit operative in response to said brake pressure control signal, a judging means for judging whether or not a request for starting antilock control has been detected by said control means while the vehicle speed is within a range between a relatively low first predetermined value and a relatively high second predetermined value and said brake operation signal is OFF, and a permission/prohibition means for enabling said control means to issue said brake pressure control signal to said brake pressure control circuit while the vehicle speed is higher than said first predetermined speed if said judging means judges that said control means has detected no request for starting antilock control, and if said judging means judges that a request for starting antilock control has been detected by said control means, to enable said control means to issue said brake pressure control signal to said brake pressure control circuit while the vehicle speed is higher than said second predetermined speed, or while the vehicle speed is within the range between said first predetermined speed and second predetermined speed providing that the brake operation signal is ON.

3. An antilock control device as claimed in claim 1, wherein said permission/prohibition means is so adapted that if no request for starting antilock control is detected by said judging means, permission to execute antilock control is given while the vehicle speed is higher than said first predetermined speed, and if a request for starting antilock control is detected by said judging means, said permission is given while the vehicle speed is higher than said second predetermined value, and permission only to continue antilock control is given while the vehicle speed is between said first and second predetermined speeds only if the brake operation signal is ON.

4. An antilock control device as claimed in claim 1, wherein said permission/prohibition means is so adapted that if no request for starting antilock control is detected by said judging means, permission to execute antilock control on said wheel to be controlled is given while the vehicle speed is higher than said first predetermined speed, and if a request for starting antilock control is detected by said judging means, said permission is given while the vehicle speed is higher than said second predetermined value, and permission only to start antilock control is given while the vehicle speed is between said first and second predetermined speeds only if the brake operation signal is ON.

5. An antilock control device as claimed in any of claims 1 or 2 or 3 or 4, wherein said permission/prohibition means is so adapted that if no request for starting antilock control is detected by said judging means, permission to execute antilock control on said wheel to be controlled is given while the vehicle speed is higher than said first predetermined speed, and if a request for starting antilock control is detected by said judging means, said permission is given while the vehicle speed is higher than said second predetermined value only if the brake operation signal is ON, and the execution of antilock control is prohibited while the vehicle speed is higher than said second predetermined value if the brake operation signal is OFF.

6. An antilock control device as claimed in claim 5, wherein said permission/prohibition means lifts the prohibition against antilock control on said wheel to be controlled while the vehicle speed is higher than said second predetermined speed and the brake operation signal is ON, if no request for the execution of antilock control is detected by the judging means for the wheels other than said wheel to be controlled.

7. An antilock control device as claimed in any of claims 1 or 2 or 3 or 4, wherein if no new request for the execution of antilock control is made for said wheel to be controlled by said judging means while a request for the execution of antilock control is being detected by said judging means, said permission/prohibition means is adapted to lift any previous prohibition against the execution of antilock control, thereby permitting the execution of antilock control as far as the vehicle speed is higher than the speed when the prohibition is lifted.

8. An antilock control device as claimed in claim 5, wherein if no request for the execution of antilock control is made for said wheel to be controlled by said judging means while a request for the execution of antilock control is being detected by said judging means, said permission/prohibition means is adapted to lift any previous prohibition against the execution of antilock control, thereby permitting the execution of antilock control as far as the vehicle speed is higher than the speed when the prohibition is lifted.

9. An antilock control device as claimed in claim 6, wherein if no new request for the execution of antilock control is made for said wheel to be controlled by said judging means while a request for the execution of antilock control is being detected by said judging means, said permission/prohibition means is adapted to lift any previous prohibition against the execution of anitlock control, thereby permitting the execution of antilock control as far as the vehicle speed is higher than the speed when the prohibition is lifted.

* * * * *